US009734871B2

(12) United States Patent
Tanaka (10) Patent No.: US 9,734,871 B2
(45) Date of Patent: Aug. 15, 2017

(54) VOICE RETRIEVAL APPARATUS, VOICE RETRIEVAL METHOD, AND NON-TRANSITORY RECORDING MEDIUM

(71) Applicant: CASIO COMPUTER CO., LTD., Tokyo (JP)

(72) Inventor: Takahiro Tanaka, Machida (JP)

(73) Assignee: CASIO COMPUTER CO., LTD. (JP)

( * ) Notice: Subject to any disclaimer, the term of this patent is extended or adjusted under 35 U.S.C. 154(b) by 0 days.

(21) Appl. No.: 15/013,681

(22) Filed: Feb. 2, 2016

(65) Prior Publication Data
US 2016/0247542 A1    Aug. 25, 2016

(30) Foreign Application Priority Data

Feb. 24, 2015  (JP) ................................. 2015-033952

(51) Int. Cl.
*G10L 15/00* (2013.01)
*G11B 27/34* (2006.01)
(Continued)

(52) U.S. Cl.
CPC .......... *G11B 27/34* (2013.01); *G06F 17/3074* (2013.01); *G10L 21/12* (2013.01); *G10L 25/54* (2013.01); *G10L 2015/088* (2013.01)

(58) Field of Classification Search
USPC .................................. 704/231–257, 270–275
See application file for complete search history.

(56) References Cited

U.S. PATENT DOCUMENTS 6,404,856 B1 *  6/2002  Wilcox ................ G11B 27/105
                                                                     379/67.1
6,507,643 B1 *  1/2003  Groner ................. H04L 51/066
                                                                     379/88.14
(Continued)

FOREIGN PATENT DOCUMENTS

JP      H8-63186 A       3/1996
JP      2001-216334 A    8/2001
(Continued)

OTHER PUBLICATIONS

Office Action dated Jun. 7, 2016 for Japanese Patent Application No. 2015-033952 and English translation of the same. (17 pages).
(Continued)

*Primary Examiner* — Jesse Pullias
(74) *Attorney, Agent, or Firm* — Fitch Even Tabin & Flannery LLP (57) ABSTRACT

A voice retrieval apparatus includes a display, a memory, and a processor executing a voice recording process of storing recorded voices in the memory, an accepting process of accepting a retrieval term, a retrieval process of retrieving, from the recorded voices, a candidate segment where an utterance of the accepted retrieval term is estimated, a replay process of replaying voices in the candidate segment retrieved in the retrieval process, and a display control process of adding a marking to display information indicating a transition of the recorded voices in time based on the replay result of the voices in the candidate segment in the replay process, and displaying the display information with the marking on the display, the marking specifying an utterance location of the voices in the candidate segment.

12 Claims, 5 Drawing Sheets

(51) Int. Cl.
    *G06F 17/30*   (2006.01)
    *G10L 25/54*   (2013.01)
    *G10L 21/12*   (2013.01)
    *G10L 15/08*   (2006.01)

(56) References Cited

U.S. PATENT DOCUMENTS

| | | | |
|---|---|---|---|
| 6,603,921 B1* | 8/2003 | Kanevsky | G11B 27/002 386/253 |
| 6,697,796 B2* | 2/2004 | Kermani | G06F 17/30017 379/88.14 |
| 6,876,729 B1 | 4/2005 | Kuter et al. | |
| 2006/0190249 A1* | 8/2006 | Kahn | G10L 15/26 704/235 |
| 2009/0006087 A1* | 1/2009 | Imoto | G10L 15/26 704/231 |
| 2009/0043581 A1* | 2/2009 | Abbott | G10L 15/187 704/254 |
| 2013/0035936 A1* | 2/2013 | Garland | G10L 15/26 704/235 |

FOREIGN PATENT DOCUMENTS

| | | |
|---|---|---|
| JP | 2001-290496 A | 10/2001 |
| JP | 2005-38014 A | 2/2005 |
| JP | 2005-107617 A | 4/2005 |
| JP | 2010-41286 A | 2/2010 |

OTHER PUBLICATIONS

Office Action dated Nov. 29, 2016 for Japanese Patent Application No. 2015-033952 and English translation of the same. (11 pages).

* cited by examiner

VOICE RETRIEVAL APPARATUS, VOICE RETRIEVAL METHOD, AND NON-TRANSITORY RECORDING MEDIUM

CROSS-REFERENCE TO RELATED APPLICATION

This application claims the benefit of Japanese Patent Application No. 2015-033952, filed on Feb. 24, 2015, the entire disclosure of which is incorporated by reference herein.

FIELD

This application relates generally to a voice retrieval apparatus, a voice retrieval method, and a non-transitory recording medium.

BACKGROUND

In recent years, voice retrieval technologies to retrieve, from recorded voices, a location where voices that a user wants to listen are uttered have been studied.

For example, Unexamined Japanese Patent Application Kokai Publication No. 2001-290496 discloses a voice retrieval apparatus which allows a user to enter a retrieval keyword by voice at the time of voice retrieval, and which retrieves a location where voices corresponding to the retrieval keyword entered by voice are uttered.

Voices retrieved by a voice retrieval apparatus are sometimes inconsistent with voices that the user wants to listen. Hence, the user needs to replay the voices retrieved by the voice retrieval apparatus, and to check whether or not the retrieved voices are consistent with the voices that the user wants to listen.

Usually, in order to carry out such a check work, the user needs to replay the retrieved multiple voices one by one in sequence, and to check the replayed voices individually. Preferably, graphical information to be displayed at the time of this check work should be displayed in a manner facilitating the user to understand.

However, in some cases, even if the user replays the retrieved voices, a replay location in a time axis is not visually understandable, or even if the user determines that the retrieved voices are proper results, the location thereof in the time axis is not visually understandable. Under such a circumstance, in a user work inherent to the voice retrieval, the way of displaying information (User Interface, "UI") is insufficient from the standpoint of visibility and operability.

Hence, the present disclosure has been made in order to address the aforementioned technical problems, and an objective of the present disclosure is to provide a voice retrieval apparatus, and the like that are suitable to display a user interface with excellent visibility and operability for a user work inherent to voice retrieval.

SUMMARY

In order to accomplish the above objective, a voice retrieval apparatus according an aspect of the present disclosure includes a display, a memory, and a processor that executes following processes:

a voice recording process of storing recorded voices in the memory;

an accepting process of accepting a retrieval term;

a retrieval process of retrieving, from the recorded voices, a candidate segment where an utterance of the accepted retrieval term is estimated;

a replay process of replaying voices in the candidate segment retrieved in the retrieval process; and a display control process of adding a marking to display information indicating a transition of the recorded voices in time based on the replay result of the voices in the candidate segment in the replay process, and displaying the display information with the marking on the display, the marking specifying an utterance location of the voices in the candidate segment.

According to the present disclosure, a user interface that has excellent visibility and operability for a user work inherent to voice retrieval.

BRIEF DESCRIPTION OF THE DRAWINGS

A more complete understanding of this application can be obtained when the following detailed description is considered in conjunction with the following drawings, in which.

DETAILED DESCRIPTION

Embodiments of the present disclosure will be explained below with reference to the accompanying figures.

Figure 1:
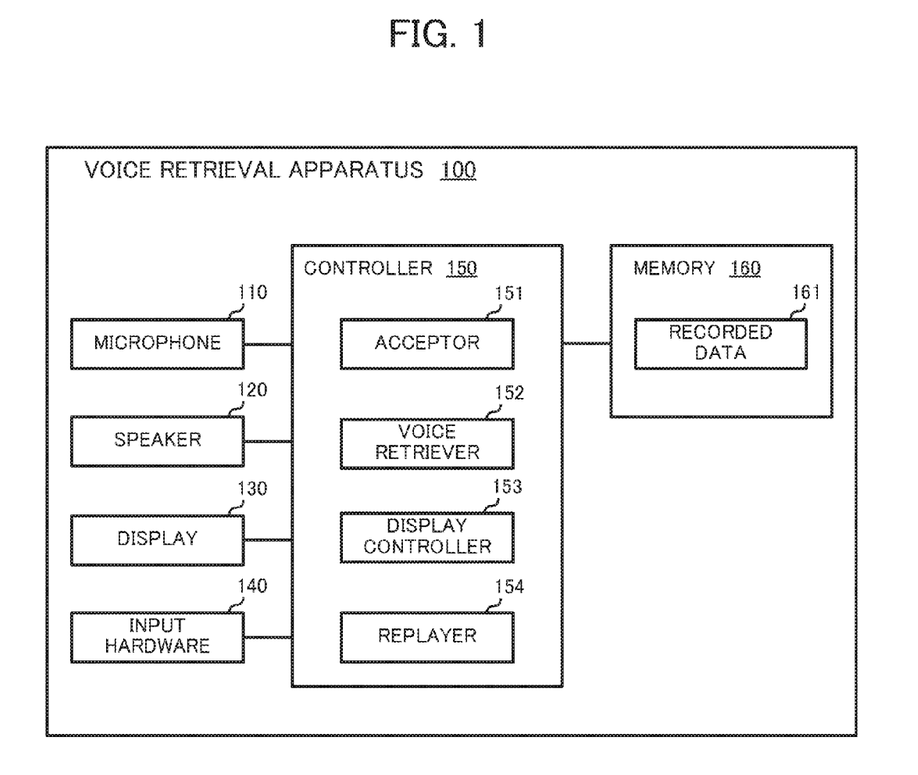
FIG. 1 is a block diagram illustrating a structure of a voice retrieval apparatus.

As illustrated in FIG. 1, a voice retrieval apparatus 100 includes a microphone 110, a speaker 120, a display 130, an input hardware 140, a controller 150, and a memory 160. This voice retrieval apparatus 100 is to perform voice retrieval on recorded voices based on a retrieval term entered by a user, and is, for example, a Personal Computer (PC), a voice recorder, or a smartphone. In this embodiment, an explanation will be given of an example case in which the voice retrieval apparatus 100 is a smartphone.

The microphone 110 is a sound input hardware that collects external sounds. The speaker 120 is a sound outputter that externally outputs sounds as audible sounds. The display 130 includes, for example, a Liquid Crystal Display (LCD) or an Electro Luminescence (EL) display, and displays a voice retrieval result, and the like.

The input hardware 140 is disposed on the upper face of the display 130, and includes a touch panel that enables the user to give and enter an operation. The input hardware 140 outputs, when a finger, and the like of the user touches various menus displayed on the display 130 as needed, an operation button, a keyboard, and the like, an input instruction that is information on the touch location to the controller 150.

The controller 150 includes a CPU, a ROM, a RAM, and the like. The CPU of the controller 150 reads and executes a program for a process (voice retrieval process) to be discussed later and stored in the ROM, thereby realizing respective functions (acceptor 151, voice retriever 152, display controller 153, and replayer 154) relating to such a process.

This voice retrieval process program is executable by the controller 150 after the user of the voice retrieval apparatus 100 downloads a smartphone application for voice retrieval, and installs such an application beforehand.

The memory 160 is a non-volatile memory like an HDD. This memory 130 stores recorded voice data 161 (hereinafter, also referred to as a voice file) that is data on recorded voices.

The voice retrieval apparatus 100 has a recording mode and a replay mode. In the recording mode, as a preparation process for voice retrieval, voices subjected to voice retrieval are recorded. In the replay mode, recorded voices recorded in the recording mode are replayed. The voice retrieval is performed prior to a so-called skip replay that replays recorded voice data from a location where the user wants to listen voices again in the replay mode.

In this case, in the recording mode, the controller 150 of the voice retrieval apparatus 100 starts recording voices upon receiving an instruction from the user to start the voice recording, and ends the voice recording upon receiving an instruction to end the voice recording. Next, the controller 150 stores the recorded voice data (voice data) 161 in the memory 160. In the recording mode, the user records voices (for example, conference voices, lecture voices) that the user wants to listen again later.

Next, respective functions (acceptor 151, voice retriever 152, display controller 153, and replayer 154) relating to the replay mode of the controller 150 will be explained.

The acceptor 151 accepts an entered retrieval term. This retrieval term is a retrieval keyword for voice retrieval, and is a text that contains Japanese KANJI, Japanese Hiragana, Japanese KATAKANA, alphabet, and the like.

Figure 2:
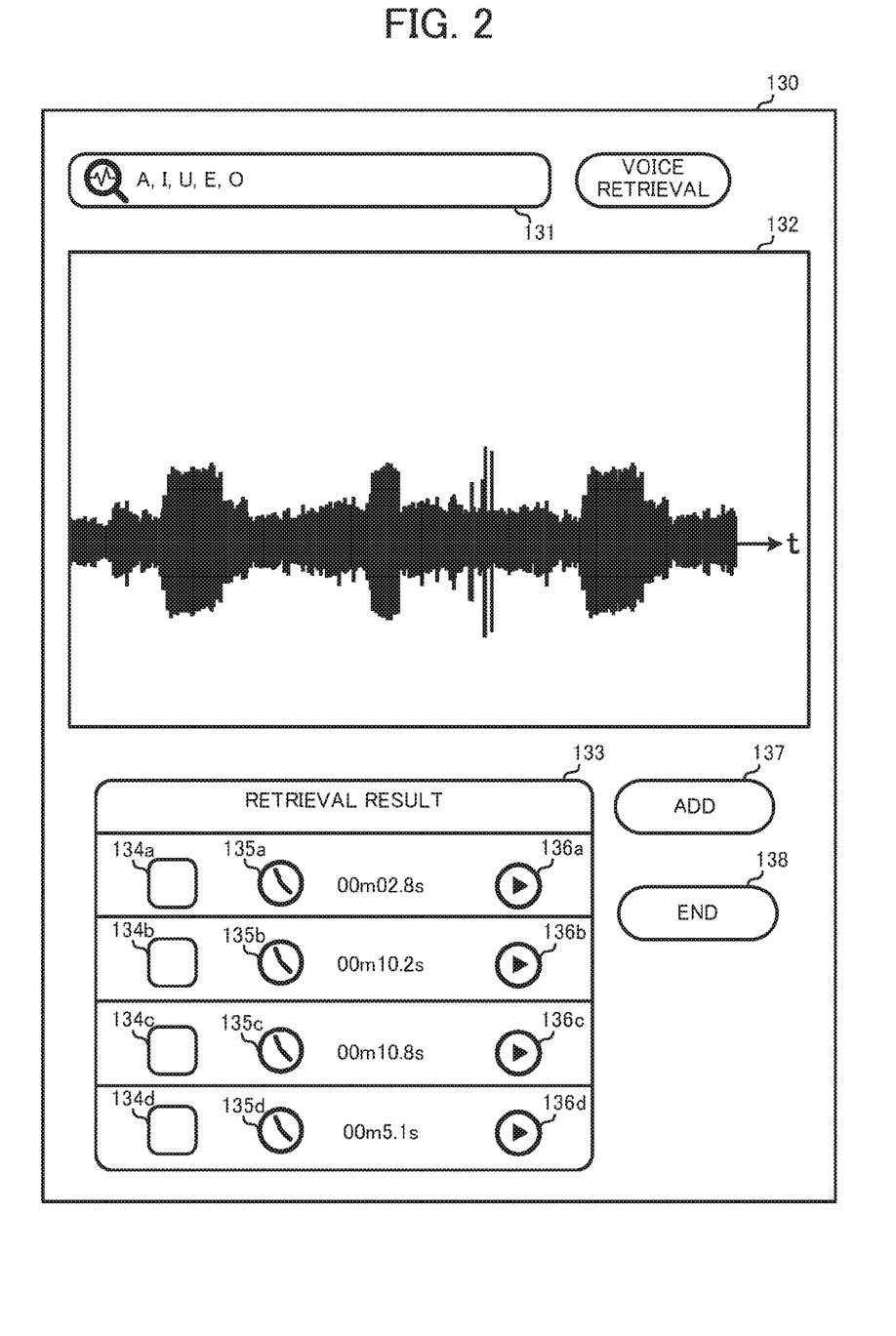
FIG. 2 is a diagram illustrating an example display screen in a replay mode.

In this case, how to enter the retrieval term will be explained with reference to FIG. 2. FIG. 2 is a diagram illustrating an example display screen in the replay mode of a smartphone application. The display 130 of the voice retrieval apparatus 100 includes a retrieve box 131 that enables the user to enter the retrieval term by text, a waveform display area 132 that displays the speech waveform of recorded voices on a time axis t, and a retrieval result list 133 that displays a list of retrieval results.

The acceptor 151 accepts a retrieval term (in FIG. 2, "a, i, u, e, o") entered by the user in the retrieval box 131.

Returning to FIG. 1, the voice retriever 152 retrieves a candidate segment where an utterance of accepted retrieval term is estimated from the recorded voices. More specifically, when the user depresses a voice retrieval button illustrated in FIG. 2, the voice retriever 152 converts the accepted retrieval term into a phoneme string, and retrieves the candidate segment from the recorded voices based on the converted phoneme string.

More specifically, the voice retriever 152 obtains a continuous time length of each phoneme from an unillustrated phoneme database after the conversion into the phoneme string, and obtains an utterance time length of the retrieval term based on the continuous time length of each phoneme. Next, the voice retriever 152 compares the converted phoneme string with the recorded voice data with the utterance time length being as a unit for the candidate segment, thereby obtaining a likelihood (a barometer indicating a similarity level between the voices of the retrieval term and voices of the recorded voices per a unit segment). In this likelihood calculation, the voice retriever 152 converts the voice data into a feature quantity by, for example, cepstrum or mel-cepstrum, and compares the result, thereby obtaining the likelihood.

The display controller 153 displays a candidate icon (candidate identification information) 135 corresponding to the candidate segment retrieved by the voice retriever 152 in the retrieval result list 133 of the display 130 as a retrieval result. In this case, when the voice retriever 152 retrieves a large number of candidate segments, the display controller 153 displays the candidate icons that identify a predetermined number of candidate segments in the order of likelihood from the first-place likelihood in the retrieval result list 133.

FIG. 2 illustrates an example case in which the voice retriever 152 retrieves a candidate segment where an utterance of the retrieval term "a, i, u, e, o" is estimated, and the display controller 153 displays the top four candidate segments in the order of likelihood. The entries of the retrieval result list 133 each include a check box 134 (134a to 134d) to be checked when the user selects the candidate segment, a candidate icon 135 (135a to 135d) including a clock icon and an utterance start time in the candidate segment, and a replay button 136 (136a to 136d) that replays voices in the candidate segment corresponding to the candidate icon 135.

In FIG. 2, the entry for the first-place likelihood in the retrieval result list 133 indicates that the utterance start time in the candidate segment for the utterance of retrieval term "a, i, u, e, o" is 2.8 seconds later from the recording start time. In the following explanation, when there is no need to particularly specify any of the check boxes 134a to 134d, those boxes are collectively referred to as a check box 134. The same is true of the candidate icons 135a to 135d and the replay buttons 136a to 136d.

Returning to FIG. 1, the replayer 154 replays voices in the candidate segment retrieved by the voice retriever 152. More specifically, the replayer 154 reads, from the memory 160, voice data of the candidate segment corresponding to the candidate icon 135 that has the replay button 136 depressed among the candidate icons 135, and replays this voice data.

This replay process will be explained below with reference to FIG. 3.

Figure 3:
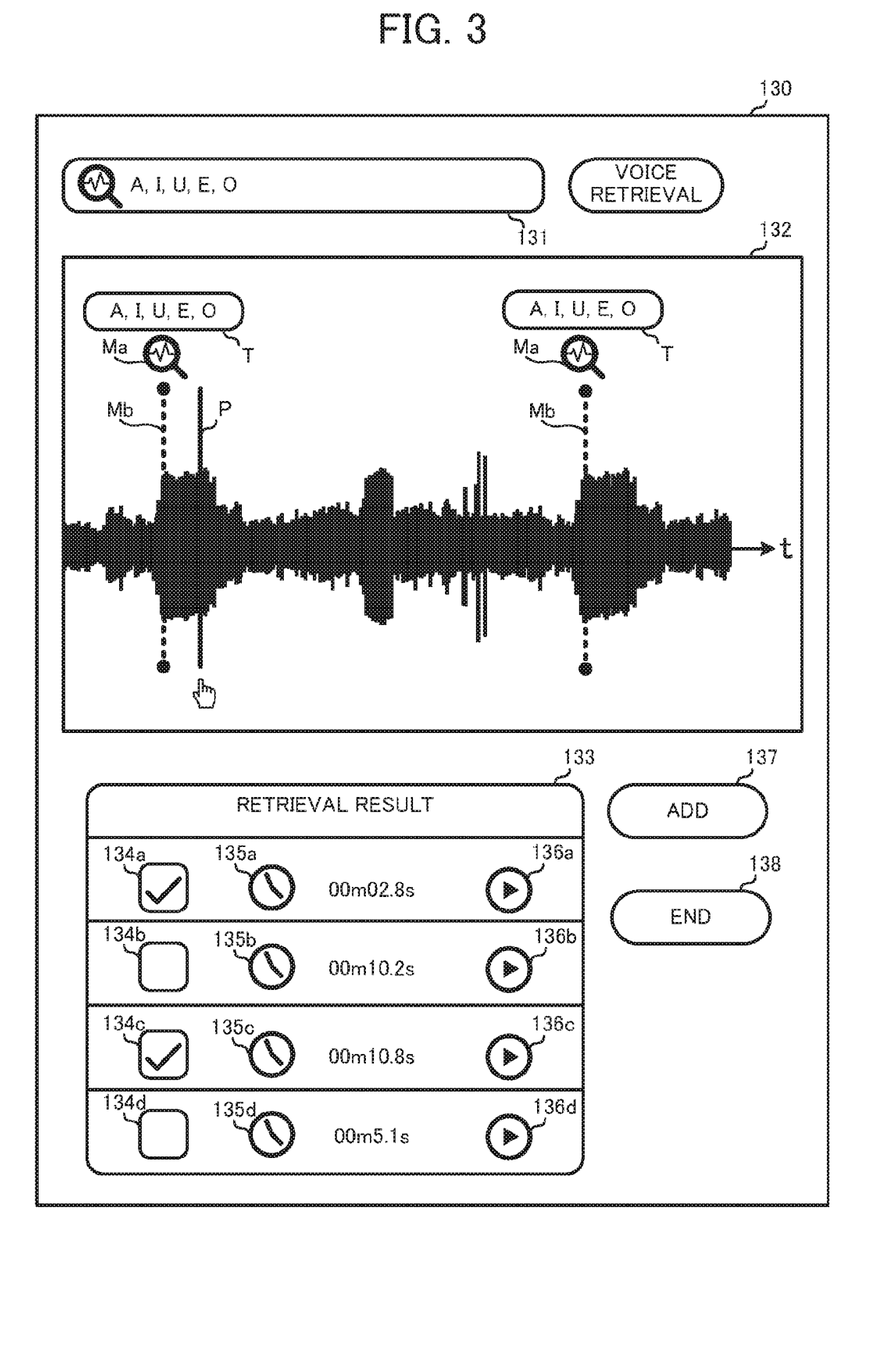
FIG. 3 is a diagram illustrating a display example that has a marking put on a speech waveform.

In the retrieval result list 133 in FIG. 3, for example, the user depresses the replay button 136a. In this case, the replayer 154 reads voice data of the candidate segment corresponding to the candidate icon 135a from the memory 160, and externally outputs voices by the speaker 120. At this time, the display controller 153 puts the replay location on a speech waveform displayed in the waveform display area 132 of the display 130 in accordance with the replayed voices in the candidate segment. As illustrated in FIG. 3, this replay location is indicated by a continuous line P and a fingertip cursor that specifies the position of the continuous line P. An object to be displayed in accordance with the replayed voices in the candidate segment is not limited to the speech waveform, and display information indicating a transition of time in accordance with the replayed voice data, for example, a bar-shape displayed object indicating an elapsed time from the start at a predetermined interval may be displayed. The following explanation will be given of an example case in which a speech waveform is displayed.

In this case, the user checks whether or not the retrieval term entered by the user (in this embodiment, "a, i, u, e, o") is uttered by listening the replayed voices while visually checking the replay location of the replayed voices in the candidate segment. When determining as a proper result, as illustrated in FIG. 3, the user checks the check box 134a. In this way, the user replays voices in the candidate segment one by one in sequence to check the utterance of the retrieval term, and when a result is proper, the user checks the check box, and does not check the check box when the result is improper. The user repeats this check work. In the example case illustrated in FIG. 3, the candidate segments with the first-place likelihood and the third-place likelihood are checked by the user.

In this case, for example, the user depresses an add button 137. This causes the display controller 153 to store, in the memory 160, information indicating that a marking is to be added to the portion of the recorded voice data corresponding to the candidate segment selected by the user's check, and puts, on the speech waveform displayed in the waveform display area 132, a marking M (search marking Ma and dashed line marking Mb) that specifies the utterance location in the selected candidate segment (in the example in FIG. 3, the candidate segments with the first and third place likelihoods). In the example case in FIG. 3, although the dashed line marking Mb is indicated at the utterance start location of voices in the candidate segment, the way of indication is not limited to this example, and for example, a hatching across the whole candidate segment may be indicated, or the dashed line marking Mb may be put at the center of the candidate segment.

The indication of the marking M by the display controller 153 can be understood that, in other words, the location of voices where the utterance of the retrieval term is confirmed is put on the speech waveform of recorded voices based on the replay result of voices in the candidate segment by the replayer 154.

The way of realizing the indication of the marking M by the display controller 153 is optional, but when, for example, the user checks the check box 134, the utterance start time in the candidate segment may be stored in association with the recorded voice data 161 of the recorded voices, and the marking M may be put (added) on the speech waveform of the recorded voices based on the stored utterance start time.

In addition, the display controller 153 adds a text T of the retrieval term (in the example case in FIG. 3, a text T for "a, i, u, e, o") to the marking M, and displays such a text T simultaneously with the indication of the marking M.

As explained above, the display controller 153 controls the UI to be displayed on the display 130, such as (1) the display of a list of candidate icons 135 that identify the respective candidate segments, (2) the display of the replayed location in the candidate segment when voices are replayed, (3) the display of the marking M that specifies the utterance location of the retrieval term, and (4) the display of the text T of the retrieval term to be added to the marking M.

Note that in FIG. 3, when the user wants to end the user's check work, the user depresses an end button 138. After this check work, the user becomes able to perform a skip replay on the recorded voices from the candidate segment determined by the user as a proper result.

Next, an explanation will be given of a flow of a voice retrieval process with reference to the flowchart of FIG. 4.

Prior to the start of this voice retrieval process, the user selects the voice file that the user wants to replay in the replay mode beforehand.

In the voice retrieval process, first of all, the acceptor 151 determines (step S11) whether or not a voice retrieval button is depressed. More specifically, after accepting the retrieval term entered in the retrieval box 131, the acceptor 151 determines whether or not the voice retrieval button is depressed.

In this case, when the voice retrieval button has not been depressed (step S11: NO), the acceptor 151 determines (step S12) whether or not a replay instruction of the recorded voices is given. When there is no such a replay instruction of the recorded voices (step S12: NO), the process returns to the step S11. In this case, the acceptor 151 stands by until the voice retrieval button is depressed or the replay instruction of the recorded voices is given (a process loop through the step S11 and the step S12).

In this case, when there is the replay instruction of the recorded voices (step S12: YES), the replayer 154 replays (step S13) the voices from the beginning of the recorded voices. More specifically, the replayer 154 replays, from the beginning, the recorded voices in the voice file selected by the user beforehand in the replay mode. Note that when there is an interruption operation given by the user like depression of the voice retrieval button while the recorded voices are replayed, the process subsequent to the step S11 may be executed immediately.

Conversely, when the acceptor 151 determines (step S11: YES) that the voice retrieval button is depressed, the voice retriever 152 retrieves (step S14) the candidate segment from the recorded voices. More specifically, the voice retriever 152 converts the accepted retrieval term into the phoneme string as explained above, and retrieves the candidate segment from the recorded voices based on the converted phoneme string.

Next, the display controller 153 displays (step S15) the list of the retrieved candidate segments. More specifically, the display controller 153 displays the candidate icons 135 that identify the respective candidate segments in the retrieval result list 133 in the order of likelihood (see FIG. 2), Next, an explanation will be given of a retrieval result process with reference to FIG. 5.

Figure 5:
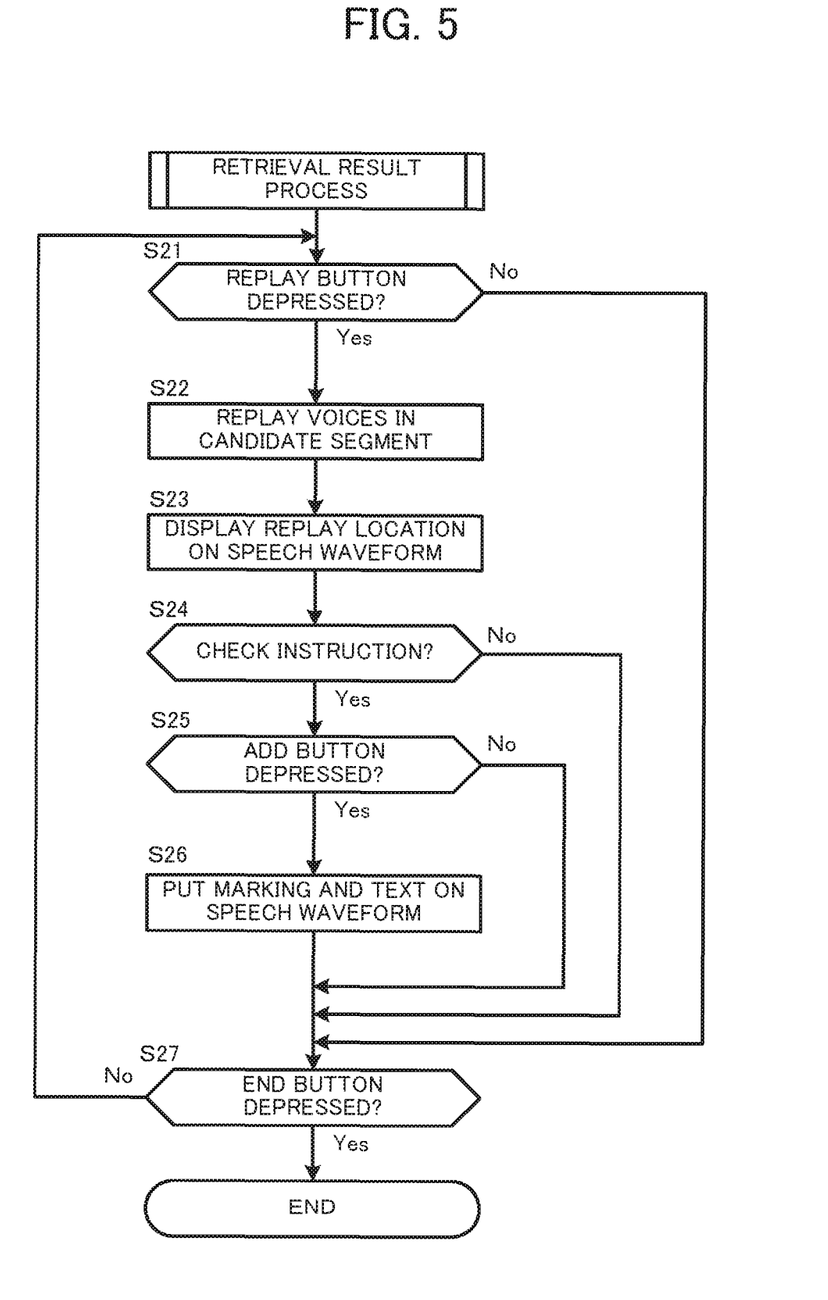
FIG. 5 is a flowchart illustrating an example flow of a retrieval result process.

In the retrieval result process, first of all, the acceptor 151 determines (step S21) whether or not the replay button 136 is depressed. When the replay button 136 has not been depressed (step S21: NO), the acceptor 151 stands by for any replay button 136 being depressed until the end button 138 is depressed (a process loop through the step S21 and the step S27).

In this case, when the acceptor 151 determines (step S21: YES) that the replay button 136 is depressed, the replayer 154 replays (step S22) the voices in the candidate segment. More specifically, the replayer 154 replays the voices in the candidate segment corresponding to the candidate icon 135 with the depressed replay button 136. Next, the display controller 153 indicates (step S23) a replay location on the speech waveform. More specifically, the display controller 153 indicates the replay location on the speech waveform displayed in the waveform display area 132 in accordance with the replayed voices in the candidate segment (see continuous line P in FIG. 3). At this time, the user checks the replayed voices while visually checking the continuous line P.

Next, the controller 150 determines (step S24) whether or not a check instruction is given. When the user determines as improper in the check work, the voices in the candidate segment are replayed until the end (step S24: NO) without a check instruction. Subsequently, when the user does not depress the end button 138 (step S27: NO), the process returns to the step S21, and the user continues the check work for the other candidate segment.

Conversely, when the user determines as proper in the check work and gives the check instruction, that is, when, for example, the user checks the check box 134a in FIG. 3 in order to select the candidate segment with the first-place likelihood, the controller 150 determines (step S24: YES) that the check instruction is given, and then determines (step S25) whether or not the add button 137 is depressed.

In this case, when the controller 150 determines (step S25: YES) that the add button 137 is depressed, the display controller 153 puts (step S26) the marking M and the text T on the speech waveform. More specifically, the controller 153 puts, on the speech waveform displayed in the waveform display area 132, the marking M (search marking Ma and dashed line marking Mb) that specifies the utterance location of the voices in the candidate segment selected by the check instruction (see FIG. 3). Simultaneously, the display controller 153 adds the text T (in the example case in FIG. 3, the text T for "a, i, u, e, o") of the retrieval term to the marking M, and displays such a text in the waveform display area 132. At this time, information indicating that the marking has been added to the location in the recorded voice data corresponding to the selected candidate segment is stored in the memory 160.

After the marking M and the text T are put in the step S26, or when the controller 150 determines (step S25: NO) that the add button 137 has not been depressed, the controller 150 determines (step S27) whether or not the end button 138 is depressed. When the controller 150 determines (step S27: NO) that the end button 138 has not been depressed, the process returns to the step S21. In this case, the user continues the check work, and depresses the replay button (when, for example, the candidate segment with the replay button 136a is already replayed, the replay button 136b) for the candidate segment not replayed yet among the multiple replay buttons 136a to 136d in the retrieval result list 133.

Conversely, when the user completes the check work and depresses the end button 138 (step S27: YES), the controller 150 ends the retrieval result process. Through the retrieval result process, the marking M that specifies the utterance location of the voices in the candidate segment determined by the user as proper is put on the speech waveform, enabling a skip replay at a later time.

Returning to FIG. 4, after the completion of the retrieval result process, the acceptor 151 determines (step S16) whether or not there is a skip replay instruction for the recorded voices. More specifically, the acceptor 151 determines whether or not a touch operation is given to the marking M put on the speech waveform in the retrieval result process. In this case, when there is the skip instruction for the recorded voices (step S16: YES), that is, when the acceptor 151 determines that there is a touch operation to the marking M, the replayer 154 performs a skip replay (step S17) on the recorded voices from the utterance location of voices in the candidate segment specified by the marking M. After the skip replay in the step S17 or when there is no skip replay instruction for the recorded voices (step S16: NO), the voice retrieval process is terminated.

Note that in the step S16, in addition to the determination on whether or not there is the skip replay instruction, whether or not a replay instruction for the recorded voices may be further determined. That is, the skip replay is not always necessary, and the skip replay or the replay from the beginning of the recorded voices may be selectively performed in accordance with the user's instruction. In addition, in FIG. 4, the voice retrieval process is terminated after the step S13 or S17, but the present disclosure is not limited to this case, and the skip replay from different locations indicated by the different markings M may be repeated in accordance with the user operation until the user gives an instruction to end the replay of the voice file.

As explained above, according to the voice retrieval process and the retrieval result process explained with reference to FIGS. 4 and 5, the display controller 153 of the voice retrieval apparatus 100 puts, on the speech waveform of recorded voices displayed in the waveform display area 132 of the display 130, the marking M that specifies the utterance location of voices in the candidate segment based on the voice replay result in the candidate segment by the replayer 154. In this embodiment, in particular, after the voices in the candidate segment are replayed, when the user gives an instruction indicating that the replayed voices are uttered voices of the retrieval term (that is, when the add button 137 is depressed after the user's check work), the marking M is put on the speech waveform.

Hence, when the user determines that the retrieved voices are proper results, the location in the candidate segment determined as proper is visually understandable in the time axis on the speech waveform. Therefore, at the time of the skip replay, the user is capable of easily specifying the replay location in the candidate segment determined as proper, and thus a user interface that has excellent visibility and operability is provided.

In addition, in this embodiment, the display controller 153 adds the text T of the retrieval term to the marking M, and puts both the text T and the marking M on the speech waveform in the waveform display area 132. This enables the user to visually check the retrieval keyword given by the user in association with the speech waveform, and thus a user interface that has an excellent visibility is provided.

Still further, in this embodiment, when the voice retriever 152 retrieves multiple candidate segments, the display controller 153 displays the candidate icons 135a to 135d that identify the respective candidate segments in the retrieval result list 133 in the order of likelihood. Hence, in comparison with a case in which the multiple candidate segments are displayed in the order of time, the user is enabled to quickly find the candidate segment that the user wants to listen voices again. Therefore, the user's check work is made efficient.

Yet still further, in this embodiment, the display controller 153 indicates the replay location on the speech waveform displayed in the waveform display area 132 of the display 130 in accordance with the replayed voices in the candidate segment by the replayer 154. Hence, the user is capable of carrying out the user's check work while visually checking the present replay location (the continuous line P and the fingertip cursor specifying the location thereof) through the speech waveform while the voices in the candidate segment are being replayed. Accordingly, the user is capable of specifying the replay location in the time axis, and thus a user interface that has an excellent visibility in the user's check work is provided.

Moreover, in this embodiment, when the recorded voices are replayed after the display controller 153 puts the marking M, the voices are replayed from the utterance location specified by the marking M. That is, a skip replay is enabled. Hence, the user is capable of listening again the recorded voices by utilizing only the proper marking M based on the user's check work. When, for example, a lecture is recorded, and the user reviews the lecture by listening again the recorded voices, the user is enabled to review the lecture efficiently.

Figure 4:
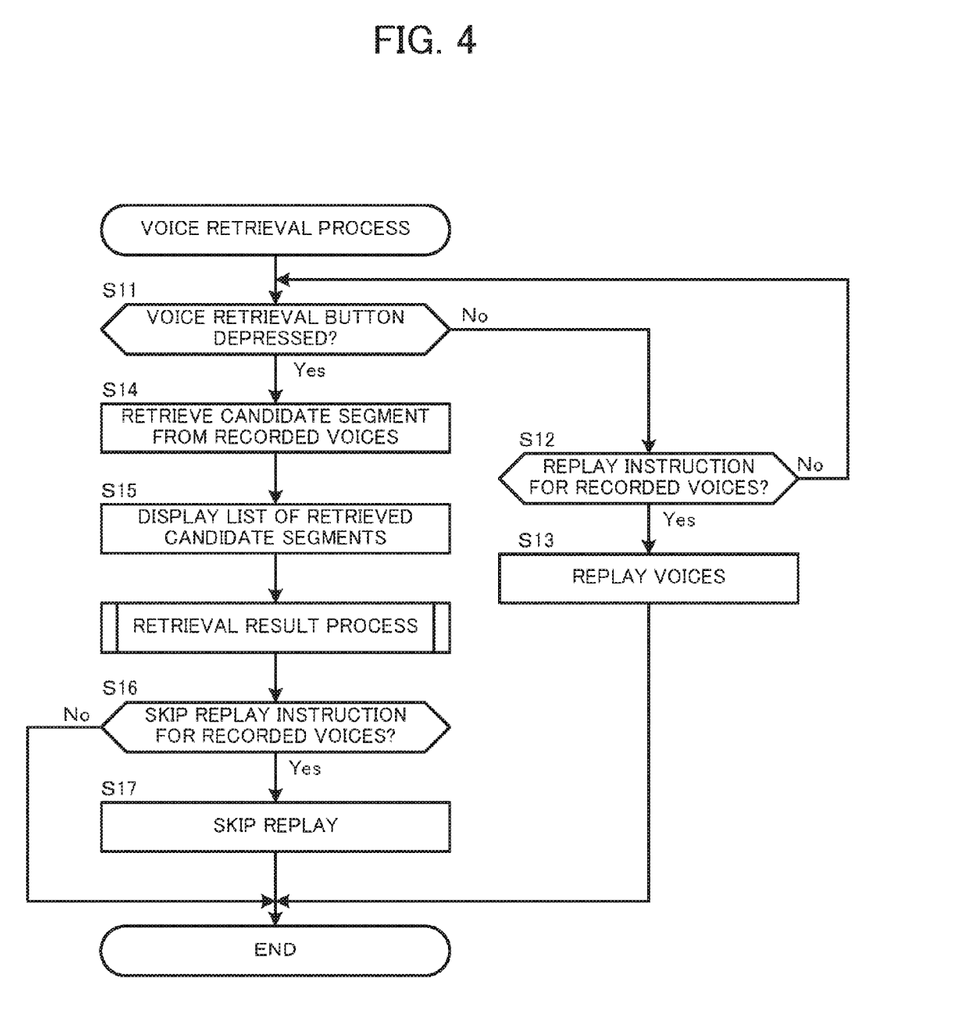
FIG. 4 is a flowchart illustrating an example flow of a voice retrieval process.

The explanation for the embodiment ends now, but the specific structure of the voice retrieval apparatus 100 and the details of respective processes illustrated in FIGS. 4 and 5 are not limited to the above-explained embodiment.

For example, in the above embodiment, the display controller 153 of the voice retrieval apparatus 100 puts the marking M in accordance with the instruction given by the user, but the present disclosure is not limited to such a case. For example, when the check work is carried out by a device instead of the user, the display controller 153 may put the marking M on the speech waveform of recorded voices displayed in the waveform display area 132 based on the check work result by such a device.

In addition, in the above embodiment, the display controller 153 displays the list of retrieval results in the retrieval result list 133 in the order of likelihood, but the present disclosure is not limited to this case. For example, in addition to the display of a list, the display controller 153 may automatically put a marking on the speech waveform for each candidate segment displayed as the retrieval result. In the example case in FIG. 3, the display controller 153 may automatically put four markings identified by the respective candidate icons 135a to 135d for each candidate segment during the voice retrieval. This enables the user to visually check the multiple candidate icons 135a to 135d displayed as the retrieval results in association with the speech waveform.

Still further, in the above embodiment, the user interface on the display screen relating to the voice retrieval and illustrated in FIGS. 2 and 3 is merely an example, and the present disclosure is not limited to this example user interface. For example, how to display the user interface (for example, the marking M, the text T, the candidate icon 135, and the continuous line P indicating the replay location) can be freely modified as long as such a modification does not change the technical signification. For example, the way of putting the search marking Ma and the dashed line marking Mb can be freely modified as long as those markings still enable the user to specify the utterance location of voices in the candidate segment.

Yet still further, in the retrieval result process illustrated in FIG. 5 according to the above embodiment, when there is a check instruction (step S24: YES) and the add button is depressed (step S25: YES), the display controller 153 puts the marking M and the text T on the speech waveform, but the present disclosure is not limited to this operation. When, for example, the user checks the check box 134, and such a user operation is accepted, the display controller 153 may put the marking M and the text T on the speech waveform. This reduces a process load originating from the retrieval result process illustrated in FIG. 5.

Moreover, the explanation was given of an example case in which the voice retrieval apparatus 100 in the above embodiment is a smartphone in which a voice retrieval smartphone application has been installed, but the present disclosure is not limited to this case. The voice retrieval apparatus can be any apparatus as long as such an apparatus is capable of storing a program for voice retrieval, and executing such a program since such an apparatus is capable of executing the voice retrieval process and the retrieval result process explained with reference to FIGS. 4 and 5. For example, the voice retrieval apparatus 100 may be a PC, a tablet terminal, or a voice recorder.

Furthermore, each process (voice retrieval process and retrieval result process) by the voice retrieval apparatus 100 according to the present disclosure is also executable by a computer like a normal PC.

More specifically, in the above embodiment, the explanation was given of an example case in which the program to realize each function relating to each process is stored in the ROM of the controller 150 beforehand. However, a program to realize each function illustrated in FIG. 1 may be stored in and distributed with a non-transitory computer readable recording medium, such as a flexible disk, a Compact Disc Read Only Memory (CD-ROM), a Digital Versatile Disc (DVD) or a Magneto-Optical disc (MO), and may be installed in a computer to construct a computer that is capable of realizing each function as explained above. In addition, the program may be stored in a storage device, or the like of a server device on a communication network like the Internet, and may be downloaded to a computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A voice retrieval apparatus comprising:
a display;
a memory; and
a processor that executes the following processes:
a voice recording process of storing recorded voices in the memory;
an accepting process of accepting a retrieval term;
a retrieval process of retrieving, from the recorded voices, a plurality of candidate segments where an utterance of the accepted retrieval term is estimated;
a first display control process of displaying a plurality of pieces of candidate identifying information respectively corresponding to the plurality of pieces of candidate segments on the display in an order of likelihood;
a first replay process of replaying voices in a candidate segment corresponding to a piece of candidate identifying information that is identified in accordance with a first user operation by which the piece of candidate identifying information is defined from the plurality of the pieces of candidate identifying information;
a user operation accepting process of accepting a second user operation by which a piece of candidate identifying information is identified from the plurality of the pieces of candidate identifying information after the voices in the candidate segment are replayed; and
a second display control process of adding a marking to a portion of display information indicating a time transition of the recorded voices, the portion of the display information corresponding to the piece of the candidate identifying information identified by the second user operation, and displaying the display information with the marking on the display, in accordance with a third user operation.

2. The voice retrieval apparatus according to claim 1, wherein the processor further executes a fourth display control process of adding a text of the retrieval term to the marking.

3. The voice retrieval apparatus according to claim 1, wherein, when the recorded voices are to be replayed after the marking is displayed on the displayer by the second display control process, the processor further executes a second replay process of replaying the voices from the utterance location specified by the marking.

4. The voice retrieval apparatus according to claim 3, wherein the processor further executes a third display control process of adding an indicator indicating the replay location to the display information and displaying the display information with the indicator on the display in accordance with the replayed voices in the candidate segment in the second replay process.

5. The voice retrieval apparatus according to claim 1, wherein the display information is a speech waveform.

6. The voice retrieval apparatus according to claim 1 wherein:
the processor replays voices in each of two or more candidate segments different from one another in accordance with the first user operation in the first replay process, the two or more candidate segments corresponding to two or more pieces of candidate identifying information that are different from one another and that are identified from a plurality of pieces of candidate identifying information by the first user operation;
the processor accepts the identification of the two or more pieces of candidate identifying information identified from the plurality of the pieces of candidate identifying information through the second user operation after replaying the voices in each of the two or more candidate segments, in the user operation accepting process; and
the processor adds two or more markings to two or more portions of the display information that correspond to the two or more pieces of candidate identifying information identified by the second user operation and displays the display information with the two or more markings on the display in accordance with the third user operation, in the second display control process.

7. A voice retrieval method comprising:
a storing step of storing recorded voices;
an accepting step of accepting a retrieval term;
a retrieval step of retrieving, from the recorded voices, a plurality of candidate segments where an utterance of the accepted retrieval term is estimated;
a first display control step of displaying a plurality of pieces of candidate identifying information respectively corresponding to the plurality of the candidate segments on a display in an order of likelihood;
a first replay step of replaying voices in a candidate segment corresponding to a piece of candidate identifying information that is identified in accordance with a first user operation by which the piece of candidate identifying information is identified from the plurality of pieces of candidate identifying information;
a user operation accepting step of accepting a second user operation by which a piece of candidate identifying information is identified from the plurality of pieces of candidate identifying information after the voices in the candidate segment are replayed; and
a second display control step of adding a marking to a portion of display information indicating a time transition of the recorded voices, the portion of the display information corresponding to the piece of the candidate identifying information identified by the second user operation, and displaying the display information with the marking on the display, in accordance with a third user operation.

8. The voice retrieval method according to claim 7, further comprising a fourth display control step of adding text of the retrieval term to the marking.

9. The voice retrieval method according to claim 7, further comprising a second replay step of replaying the voices from an utterance location specified by the marking when the recorded voices are to be replayed after displaying the marking on the display by the second display control step.

10. The voice retrieval method according to claim 9, further comprising a third display control step of adding an indicator indicating a replay location to the display information and displaying the display information with the indicator on the display in accordance with the replayed voices in the candidate segment in the second replay step.

11. The voice retrieval method according to claim 7, wherein the display information is a speech waveform.

12. A non-transitory recording medium having stored therein a program that causes a computer of a voice retrieval apparatus including a display and a memory to execute:
a voice recording process of storing recorded voices in the memory;
an accepting process of accepting a retrieval term;
a retrieval process of retrieving, from the recorded voices, a plurality of candidate segments where an utterance of the accepted retrieval term is estimated;
a first display control process of displaying a plurality of pieces of candidate identifying information respectively corresponding to the plurality of the candidate segments on the display in an order of likelihood;
a first replay process of replaying voices in a candidate segment corresponding to a piece of candidate identifying information that is identified in accordance with a first user operation by which the piece of candidate identifying information is identified from the plurality of the pieces of candidate identifying information;
a user operation accepting process of accepting a second user operation by which a piece of candidate identifying information is identified from the plurality of the pieces of candidate identifying information after the voices in the candidate segment are replayed; and
a second display control process of adding a marking to a portion of display information indicating a time transition of the recorded voices, the portion of the display information corresponding to the piece of the candidate identifying information identified by the second user operation, and displaying the display information with the marking on the display, in accordance with a third user operation.

* * * * *